US009989425B2

(12) United States Patent
Mitchell et al.

(10) Patent No.: US 9,989,425 B2
(45) Date of Patent: Jun. 5, 2018

(54) ATTENUATION CORRECTION FOR DISTRBUTED TEMPERATURE SENSORS USING ANTISTOKES TO RAYLEIGH RATIO

(71) Applicants: Ian Mitchell, Radford, VA (US); William Johnston, Blacksburg, VA (US); Ashwin Chandran, Christiansburg, VA (US)

(72) Inventors: Ian Mitchell, Radford, VA (US); William Johnston, Blacksburg, VA (US); Ashwin Chandran, Christiansburg, VA (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 408 days.

(21) Appl. No.: 14/664,254

(22) Filed: Mar. 20, 2015

(65) Prior Publication Data
US 2015/0300891 A1 Oct. 22, 2015

Related U.S. Application Data

(60) Provisional application No. 61/981,980, filed on Apr. 21, 2014.

(51) Int. Cl.
G01K 11/32 (2006.01)
E21B 47/12 (2012.01)
E21B 47/06 (2012.01)

(52) U.S. Cl.
CPC ............ G01K 11/32 (2013.01); E21B 47/065 (2013.01); E21B 47/123 (2013.01); G01K 2011/324 (2013.01)

(58) Field of Classification Search
None
See application file for complete search history.

(56) References Cited

U.S. PATENT DOCUMENTS 5,765,948 A 6/1998 Sai
7,628,531 B2 12/2009 Lee et al.
(Continued)

FOREIGN PATENT DOCUMENTS

GB 2183821 A 6/1987
WO 2007106827 A1 9/2007

OTHER PUBLICATIONS

International Search Report and Written Opinion for PCT Application No. PCT/US2015/021472, dated Jun. 25, 2015, pp. 1-10.
(Continued)

Primary Examiner — An Do
Assistant Examiner — Renee I Wilson
(74) Attorney, Agent, or Firm — Cantor Colburn LLP

(57) ABSTRACT

A distributed temperature sensor, a method of determining temperature, and a processing system to compute temperature are described. The sensor includes an optical fiber disposed in an area where temperature is to be measured, a primary light source to inject light into the optical fiber, and a secondary light source to inject light into the optical fiber. The sensor additionally includes a photodetector to detect backscatter light energy from the optical fiber the backscatter light energy including Stokes Raman scatter or anti-Stokes Raman scatter and primary Rayleigh scatter resulting from the primary light source and secondary Rayleigh scatter resulting from the secondary light source, and a processor to determine temperature based on a ratio of the Stokes Raman scatter or the anti-Stokes Raman scatter and a combination of the primary Rayleigh scatter and the secondary Rayleigh scatter.

16 Claims, 3 Drawing Sheets

(56) References Cited

U.S. PATENT DOCUMENTS

| | | |
|---|---|---|
| 2006/0209291 A1 | 9/2006 | Yamate et al. |
| 2006/0245468 A1 | 11/2006 | Hartog |
| 2007/0223556 A1* | 9/2007 | Lee .................. G01K 11/32 374/1 |
| 2010/0128756 A1* | 5/2010 | Lee .................. G01K 11/32 374/161 |
| 2013/0003777 A1 | 1/2013 | Jaaskelainen et al. |
| 2013/0209029 A1 | 8/2013 | Mitchell et al. |
| 2014/0233600 A1* | 8/2014 | Lee .................. G01K 15/005 374/1 |

OTHER PUBLICATIONS

Extended European Search Report for EP Application No. 15783518.2-1609, dated Dec. 1, 2017, pp. 1-8.

Mitchell et al., "Method for Attenuation Calibration of Dual Wavelength Raman Distributed Temperature Sensing Systems", SPE 165400, Jun. 2013, pp. 1-3.

* cited by examiner

ATTENUATION CORRECTION FOR DISTRBUTED TEMPERATURE SENSORS USING ANTISTOKES TO RAYLEIGH RATIO

CROSS-REFERENCE TO RELATED APPLICATION

This application is a Non-Provisional of U.S. Provisional Patent Application Ser. No. 61/981,980 filed Apr. 21, 2014, the disclosure of which is disclosure of which is incorporated by reference herein in its entirety.

BACKGROUND

Distributed temperature sensors (DTS) are optoelectronic devices that measure temperature using optical fibers. When light is transmitted in an optical fiber, the photons may be elastically scattered (Rayleigh scattering) and inelastically scattered (Raman scattering and Brilloin scattering). In Raman scattering, the scattered photon may have less energy than the incident photon (Stokes Raman scattering) due to absorption of energy by the optical fiber or the scattered photon may have more energy than the incident photon (anti-Stokes Raman scattering) due to loss of energy by the optical fiber. A ratio of the anti-Stokes Raman scattering to the Stokes Raman scattering may be used to determine the temperature. Alternatively, a ratio of Stokes Raman scattering or anti-Stokes Raman scattering to Rayleigh scattering may be used to determine temperature.

SUMMARY

According to an aspect of the invention, a distributed temperature sensor includes an optical fiber disposed in an area where temperature is to be measured; a primary light source configured to inject light into the optical fiber; a secondary light source configured to inject light into the optical fiber; a photodetector configured to detect backscatter light energy from the optical fiber the backscatter light energy including Stokes Raman scatter or anti-Stokes Raman scatter and primary Rayleigh scatter resulting from the primary light source and secondary Rayleigh scatter resulting from the secondary light source; and a processor configured to determine temperature based on a ratio of the Stokes Raman scatter or the anti-Stokes Raman scatter and a combination of the primary Rayleigh scatter and the secondary Rayleigh scatter.

According to another aspect of the invention, a method of determining temperature includes disposing an optical fiber in an area where the temperature is to be measured; injecting, using a primary light source, primary light into the optical fiber; injecting, using a secondary light source, secondary light into the optical fiber; detecting, using a photodetector, backscatter light energy resulting in the optical fiber from the primary light source and the secondary light source, the backscatter light energy including anti-Stokes Raman scatter and primary Rayleigh scatter resulting from the primary light source and secondary Rayleigh scatter resulting from the secondary light source; and processing the backscatter light energy to determine the temperature based on a ratio of the anti-Stokes Raman scatter and a combination of the primary Rayleigh scatter and the secondary Rayleigh scatter.

According to yet another aspect of the invention, a processing system configured to compute temperature includes an input interface configured to receive backscatter light energy resulting in an optical fiber based on a primary light source and a secondary light source injecting light into the optical fiber, the backscatter light energy including Stokes Raman scatter or anti-Stokes Raman scatter and primary Rayleigh scatter based on the primary light source and secondary Rayleigh scatter based on the secondary light source; and a processor configured to determine the temperature based on a ratio of the Stokes Raman scatter or the anti-Stokes Raman scatter and a combination of the primary Rayleigh scatter and the secondary Rayleigh scatter.

BRIEF DESCRIPTION OF THE DRAWINGS

Referring now to the drawings wherein like elements are numbered alike in the several Figures.

DETAILED DESCRIPTION

As noted above, a distributed temperature sensor (DTS) may use a ratio of the anti-Stokes Raman scattering to the Rayleigh scattering to determine temperature. The DTS is susceptible to inaccuracy and drift caused by dynamically varying attenuation. The attenuation variance may be commonly caused by mechanical stress and strain or degradation of the optical fiber due to various chemicals. For example, when the DTS is employed in a downhole application, hydrogen ingress into oil and gas wells may cause degradation of the optical fiber. A looped fiber configuration and a more robust fiber glass chemistry are among the techniques attempted to correct the attenuation variance. Multiple lasers with wavelengths selected to cancel out the effects of changing attenuation have also been used. Embodiments of the systems and methods described herein relate to using Stokes Raman scattering or anti-Stokes Raman and Rayleigh scattering collected from one laser source and Rayleigh scattering collected from an additional laser source to determine temperature. According to the embodiments detailed below, inaccuracy in temperature measurements resulting from attenuation is eliminated.

Figure 1:
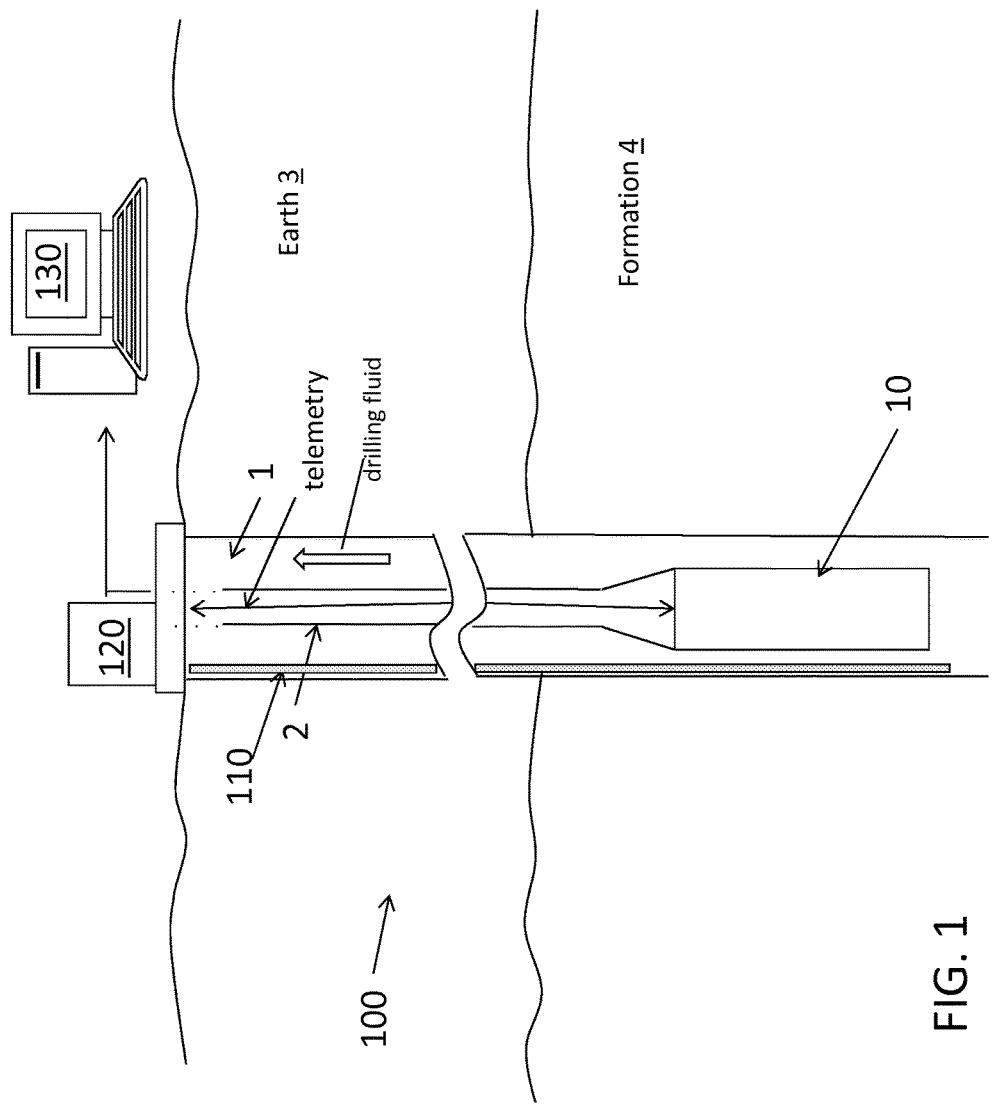
FIG. 1 is a cross-sectional illustration of a borehole and a distributed temperatures sensor (DTS) according to embodiments of the invention.

FIG. 1 is a cross-sectional illustration of a borehole 1 and a distributed temperatures sensor (DTS) 100 according to embodiments of the invention. The arrangement shown in FIG. 1 is one exemplary use of the DTS 100. While the DTS 100 may be used in other environments and in other subsurface arrangements, the exemplary DTS 100 shown in FIG. 1 is arranged to measure temperature in a borehole 1 penetrating the earth 3 including a formation 4. A set of tools 10 may be lowered into the borehole 1 by a string 2. In embodiments of the invention, the string 2 may be a casing string, production string, an armored wireline, a slickline, coiled tubing, or a work string. In measure-while-drilling (MWD) embodiments, the string 2 may be a drill string, and a drill would be included below the tools 10. Information from the sensors and measurement devices included in the set of tools 10 may be sent to the surface for processing by the surface processing system 130 via a fiber link or telemetry. The surface processing system 130 (e.g., computing device) includes one or more processors and one or more memory devices in addition to an input interface and an output device. The DTS 100 includes an optical fiber 110

(the device under test, DUT). The DTS 100 may be used to monitor temperature in the borehole 1. In other embodiments, with a cased borehole 1 or with the DTS 100 arranged with the optical fiber 110 along a pipeline, the DTS 100 may be used to monitor temperature along the pipeline, which may be disposed on the surface or in a sub-sea environment. Embodiments of the optical fiber 110 are further detailed below. The DTS 100 also includes a surface interrogation unit 120, further discussed with reference to FIG. 2.

Figure 2:
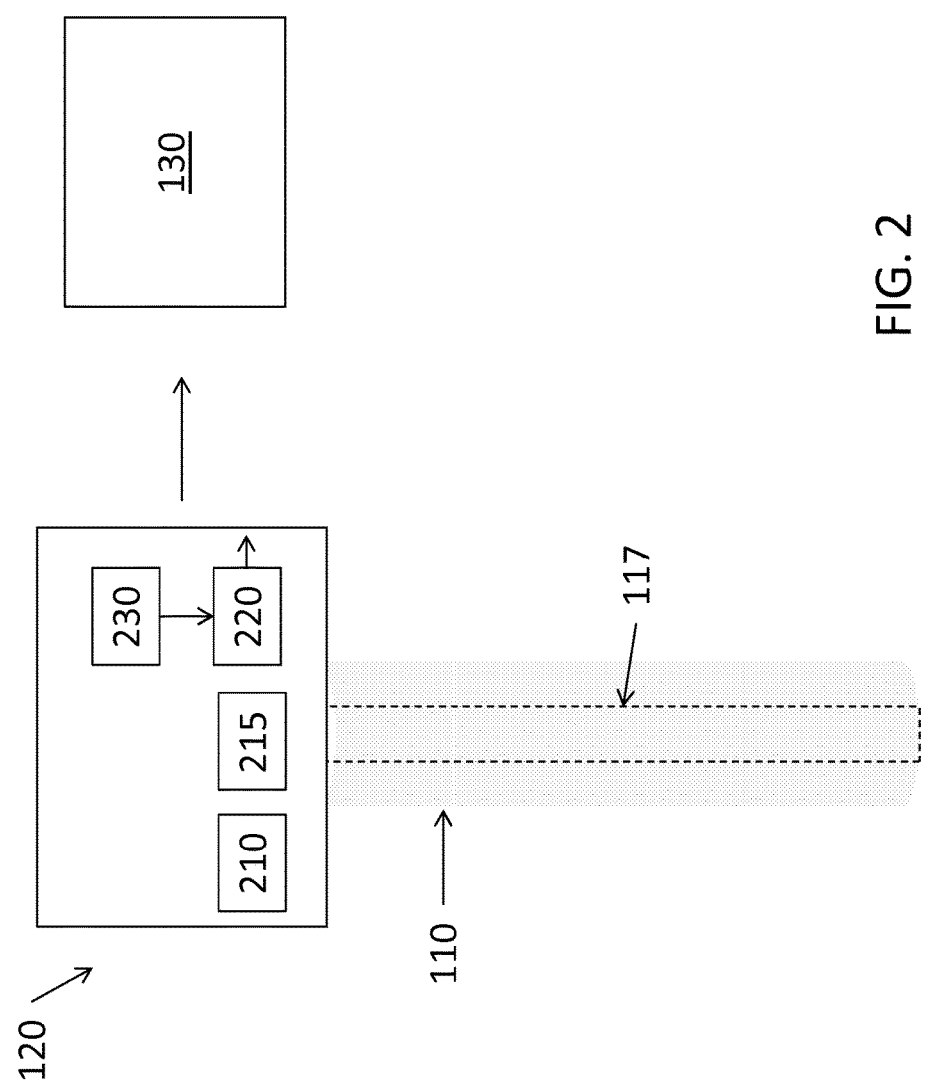
FIG. 2 details the DTS shown in FIG. 1 according to one embodiment of the invention.

FIG. 2 details the DTS 100 shown in FIG. 1 according to one embodiment of the invention. The DTS 100 includes a surface interrogation unit 120, a primary light source 210, a secondary light source 215, and one or more photodetectors 220 to receive the reflected signals or scatter from the optical fiber 110. The surface interrogation unit 120 may additionally include a processing system 230 with one or more processors and memory devices to process the scatter resulting from illuminating the optical fiber 110 with a fiber core 117. Alternately, the photodetectors 220 may output the reflection information to the surface processing system 130 for processing. While the DTS 100 is discussed specifically as a temperature detector, the DTS 100 and the arrangement of the optical fiber 110 and surface interrogation unit 120 may be used additionally to determine other parameters based on the reflections or backscatter detected by the one or more photodetectors 220. In one embodiment involving optical time domain reflectometry (OTDR), the primary light source 210 and the secondary light source 215 may be coherent light sources in which light waves are in phase with one another. The primary light source 210 and the secondary light source 215 may be a laser, for example. In an exemplary embodiment, the wavelength and amplitude of pulses emitted by the primary light source 210 and pulses emitted by the secondary light source 215 are not varied over time. The wavelength at which the secondary light source 215 operates is (appreciably) equal to the Stokes Raman scattering wavelength or the anti-Stokes Raman scattering wavelength generated by the primary light source 210, based on whether Stokes Raman scatter or anti-Stokes Raman scatter is used to determine temperature, as detailed below. The one or more photodetectors 220 obtain three signals used in the determination of temperature: the Stokes Raman scatter or anti-Stokes Raman scatter intensity or signal generated by the primary light source 210, the Rayleigh signal generated by the primary light source 210, and the Rayleigh signal generated by the secondary light source 215. The temperature determination is detailed below with reference to FIG. 3. In alternate embodiments, optical frequency domain reflectometry (OFDR) or pulse code modulation may be used. While these alternate embodiments affect the type of interrogation signal that is transmitted along the optical fiber 110, the return signals may be processed to obtain the three signals needed to determine temperature such that the temperature determination is unchanged from the description below.

Figure 3:
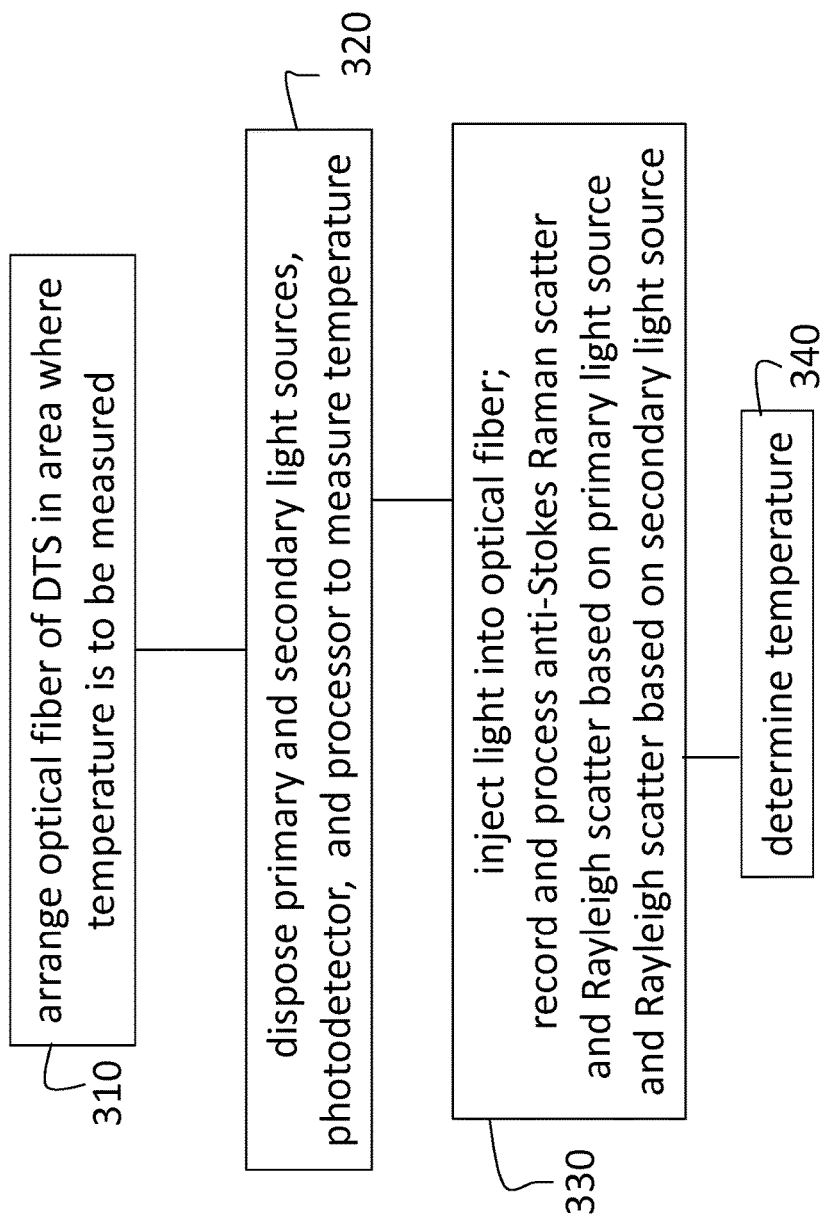
FIG. 3 is a process flow of a method of measuring temperature with a DTS according to embodiments of the invention.

FIG. 3 is a process flow of a method of measuring temperature with a DTS 100 according to embodiments of the invention. At block 310, arranging the optical fiber 110 in the area where temperature is to be determined may include arranging the optical fiber 110 downhole as shown in FIG. 1, for example. The optical fiber 110 may also be arranged along a pipeline (either downhole, under the sea, or above the surface) or in a different environment. At block 320, the process includes disposing the primary light source 210, the secondary light source 215, the one or more photodetectors 220, and a processor 230 (or another processor, such as the surface processing system 130) to measure the temperature. At block 330, injecting light into the optical fiber 110 includes injecting light from both the primary light source 210 and the secondary light source 215. The process at block 330 also includes the one or more photodetectors 220 recording light intensity resulting from Stokes Raman scatter or anti-Stokes Raman scatter and Rayleigh scatter generated by the primary light source 210 and light intensity resulting from Rayleigh scatter generated by the secondary light source 215 and the processor 230 (130) processing the recorded data. As noted above, the secondary light source 215 emits light at a wavelength corresponding to the Stokes Raman scatter resulting from the primary light source 210 or corresponding to the anti-Stokes scatter resulting from the primary light source 210 based on whether the Stokes Raman scatter or the anti-Stokes Raman scatter is recorded by the one or more photodetectors 220 and used in the determination of temperature. As also noted above, alternate embodiments may involve OFDR or pulse code modulation to interrogate the optical fiber 110 rather than OTDR. Determining temperature at block 340 is done by the processor 230 as detailed below.

The anti-Stokes Raman signal (light intensity resulting from anti-Stokes scatter generated by the primary light source 210) AS is approximated as:

$$\frac{1}{\lambda_{as}^4} F(T) \cdot \alpha(\lambda_p)\alpha(\lambda_{as}) \qquad [\text{EQ. 1}]$$

F(T) includes all the temperature-dependent terms, $\alpha(\lambda_p)$ is the attenuation for the pulse traveling down the optical fiber 110 (away from the photodetector 220), and $\alpha(\lambda_{as})$ is the attenuation for the backscatter traveling up the optical fiber 110 (toward the photodetector 220) after undergoing the (anti-Stokes) Raman scattering effect. $\lambda_{as}$ is the wavelength of the anti-Stokes Raman scatter. The Stokes Raman scatter signal (light intensity resulting from Stokes scatter generated by the primary light source 210) S is approximated as:

$$\frac{[1 + F(T)]\alpha(\lambda_p)\alpha(\lambda_s)}{\lambda_s^4} \qquad [\text{EQ. 2}]$$

$\lambda_s$ is the wavelength of the Stokes Raman scatter, and $\alpha(\lambda_s)$ is the attenuation for the backscatter traveling up the optical fiber 110 (toward the photodetector 220) after undergoing the (Stokes) Raman scattering effect. The Rayleigh signal (light intensity resulting from Rayleigh scattering generated by the primary light source 210) RAp is given by:

$$\frac{1}{\lambda_p^4} \sigma \cdot \alpha(\lambda_p)\alpha(\lambda_p) \qquad [\text{EQ. 3}]$$

σ represents all the geometrical and fundamental constants associated with RAp. In the case of (elastic) Rayleigh scattering, there is no change in wavelength between the pulse (associated with the injected light) travelling down the optical fiber 110 and the backscatter (associated with the Rayleigh scattering) travelling up the optical fiber 110. Thus, $\alpha(\lambda_p)$ is used twice in EQ. 2. The Rayleigh signal (light intensity resulting from Rayleigh scattering generated by the secondary light source 210) RAas is given by:

$$\frac{1}{\lambda_{as}^4}\kappa \cdot \alpha(\lambda_{as})\alpha(\lambda_{as}) \quad [\text{EQ. 4}]$$

κ represents all the geometrical and fundamental constants associated with RAas. As noted with reference to RAp, there is no change in wavelength between the pulse (associated with the injected light) travelling down the optical fiber 110 and the backscatter (associated with the Rayleigh scattering) travelling up the optical fiber 110. Thus, $\alpha(\lambda_{as})$ is used twice in EQ. 4. As noted above, in the OTDR example being detailed for explanatory purposes, the secondary light source 215 transmits at a wavelength of the anti-Stokes Raman scatter resulting from the primary light source 210 when anti-Stokes Raman scatter (rather than Stokes Raman scatter) is used to determine temperature. Thus, in EQ. 4, the designation "as" (anti-Stokes) is used for the wavelength associated with the secondary light source 215. Typically, the ratio of anti-Stokes Raman scattering based on the primary light source 210 (given by EQ. 1) to Rayleigh scattering resulting from the primary light source 210 (given by EQ. 3) would be used determine temperature according to the temperature dependent terms F(T) in EQ. 1. According to embodiments of the invention, temperature is instead determined according to either:

$$\frac{AS}{\sqrt{RAp}\sqrt{RAas}} \quad [\text{EQ. 5}]$$

or according to:

$$\frac{S}{\sqrt{RAp}\sqrt{RAs}} \quad [\text{EQ. 6}]$$

In EQ. 6, RAs indicates that the secondary light source 215 that results in the Rayleigh scatter (RAs) operates at a wavelength of the Stokes Raman scatter resulting from the primary light source 210. According to EQ. 1 (using anti-Stokes Raman scatter) and EQ. 5, the equation used to calculate temperature is given by:

$$\frac{\frac{1}{\lambda_{as}^4}F(T)}{\sqrt{\left(\frac{1}{\lambda_p\lambda_{as}}\right)^4 \cdot \sigma\kappa}}, \quad [\text{EQ. 7}]$$

As indicated by EQ. 7, the attenuation terms in EQs. 1, 3, and 4 cancel out such that temperature may be calculated without the inaccuracy that results from the attenuation terms. The attenuation terms cancel out when EQ. 6 (rather than EQ. 5) is used to determine temperature. By using EQs. 5 or 6 on the backscatter originating from multiple points along the optical fiber 110, a temperature profile along the optical fiber 110 may be developed.

While one or more embodiments have been shown and described, modifications and substitutions may be made thereto without departing from the spirit and scope of the invention. Accordingly, it is to be understood that the present invention has been described by way of illustrations and not limitation.

The invention claimed is:

1. A distributed temperature sensor, comprising:
   an optical fiber disposed in an area where temperature is to be measured;
   a primary light source configured to inject light into the optical fiber;
   a secondary light source configured to inject light into the optical fiber, the light injected by the secondary light source as pulses always having a wavelength either equal to a Stokes Raman scatter resulting from injection of the light injected by the primary light source or a wavelength equal to an anti-Stokes Raman scatter resulting from injection of the light injected by the primary light source;
   a photodetector configured to detect backscatter light energy from the optical fiber the backscatter light energy including the Stokes Raman scatter or the anti-Stokes Raman scatter resulting from the injection of the light injected by the primary light source, primary Rayleigh scatter resulting from the primary light source, and secondary Rayleigh scatter resulting from the secondary light source; and
   a processor configured to calculate temperature based on a ratio of the Stokes Raman scatter to a combination of the primary Rayleigh scatter and the secondary Rayleigh scatter or the anti-Stokes Raman scatter to the combination of the primary Rayleigh scatter and the secondary Rayleigh scatter.

2. The sensor according to claim 1, wherein the processor determines the temperature based on $$\frac{S}{\sqrt{RAp}\sqrt{RAs}},$$

where S is the Stokes Raman backscatter, RAp is the primary Rayleigh backscatter, and RAs is the secondary Rayleigh backscatter.

3. The sensor according to claim 1, wherein the processor determines the temperature based on $$\frac{AS}{\sqrt{RAp}\sqrt{RAas}},$$

where AS is the anti-Stokes Raman backscatter, RAp is the primary Rayleigh backscatter, and RAas is the secondary Rayleigh backscatter.

4. The sensor according to claim 3, wherein the processor determines the temperature according to $$\frac{\frac{1}{\lambda_{as}^4}F(T)}{\sqrt{\left(\frac{1}{\lambda_p\lambda_{as}}\right)^4 \cdot \sigma\kappa}},$$

where $\lambda_{as}$ is a wavelength of the anti-Stokes Raman scatter, $\lambda_p$ is a wavelength of the first Rayleigh scatter, σ represents all geometrical and fundamental constants associated with RAp, κ represents all the geometrical and fundamental constants associated with RAas, and F(T) includes all temperature dependent terms.

5. The sensor according to claim 1, wherein the area is a subsurface environment to determine the temperature in a borehole.

6. The sensor according to claim 1, wherein the photodetector detects the backscatter light energy from the optical fiber originating at a plurality of points along the optical fiber, and the processor determines the temperature at the plurality of points along the optical fiber.

7. A method of determining temperature, the method comprising:
disposing an optical fiber in an area where the temperature is to be measured;
injecting, using a primary light source, primary light into the optical fiber;
injecting, using a secondary light source, secondary light as pulses into the optical fiber, the secondary light always having a wavelength either equal to Stokes Raman scatter generated by the injecting the primary light or equal to anti-Stokes Raman scatter generated by the injecting the primary light;
detecting, using a photodetector, backscatter light energy resulting in the optical fiber from the primary light source and the secondary light source, the backscatter light energy including the anti-Stokes Raman scatter or the Stokes Raman scatter generated by the injecting the primary light, primary Rayleigh scatter resulting from the injecting the primary light, and secondary Rayleigh scatter resulting from the injecting the secondary light; and
processing the backscatter light energy to calculate the temperature based on a ratio of the anti-Stokes Raman scatter to a combination of the primary Rayleigh scatter and the secondary Rayleigh scatter or the Stokes Raman scatter to the combination of the primary Rayleigh scatter and the secondary Rayleigh scatter.

8. The method according to claim 7, wherein the processing the light energy includes determining the temperature based on $$\frac{S}{\sqrt{RAp}\sqrt{RAs}},$$

where S is the Stokes Raman scatter, RAp is the primary Rayleigh scatter, and RAs is the secondary Rayleigh scatter.

9. The method according to claim 7, wherein the processing the light energy includes determining the temperature based on $$\frac{AS}{\sqrt{RAp}\sqrt{RAas}},$$

where AS is the anti-Stokes Raman scatter, RAp is the primary Rayleigh scatter, and RAas is the secondary Rayleigh scatter.

10. The method according to claim 9, wherein the determining the temperature is according to $$\frac{\frac{1}{\lambda_{as}^4}F(T)}{\sqrt{\left(\frac{1}{\lambda_p\lambda_{as}}\right)^4 \cdot \sigma\kappa}}$$

where $\lambda_{as}$ is a wavelength of the anti-Stokes Raman scatter, $\lambda_p$ is a wavelength of the first Rayleigh scatter, σ represents all geometrical and fundamental constants associated with RAp, κ represents all the geometrical and fundamental constants associated with RAas, and F(T) includes all temperature dependent terms.

11. The method according to claim 7, wherein the disposing the optical fiber in the area includes disposing the optical fiber in a subsurface environment to determine the temperature in a borehole.

12. The method according to claim 7, wherein the detecting includes detecting the backscatter light energy originating from a plurality of points along the optical fiber, and determining the temperature at the plurality of points along the optical fiber.

13. A processing system configured to compute temperature, the system comprising:
an input interface configured to receive backscatter light energy resulting in an optical fiber based on a primary light source and a secondary light source injecting light into the optical fiber, the secondary light source injecting light as pulses always with a wavelength either equal to Stokes Raman scatter resulting from injecting light from the primary light source or equal to anti-Stokes Raman scatter resulting from injecting the light from the primary light source, the backscatter light energy including the Stokes Raman scatter or the anti-Stokes Raman scatter resulting from injecting the light from the primary light source, primary Rayleigh scatter based on the primary light source, and secondary Rayleigh scatter based on the secondary light source; and
a processor configured to calculate temperature based on a ratio of the Stokes Raman scatter to a combination of the primary Rayleigh scatter and the secondary Rayleigh scatter or the anti-Stokes Raman scatter to the combination of the primary Rayleigh scatter and the secondary Rayleigh scatter.

14. The system according to claim 13, wherein the processor determines the temperature based on $$\frac{S}{\sqrt{RAp}\sqrt{RAs}},$$

where S is the Stokes Raman scatter, RAp is the primary Rayleigh scatter, and RAs is the secondary Rayleigh scatter.

15. The system according to claim 13, wherein the processor determines the temperature based on $$\frac{AS}{\sqrt{RAp}\sqrt{RAas}},$$

where AS is the anti-Stokes Raman scatter, RAp is the primary Rayleigh scatter, and RAas is the secondary Rayleigh scatter.

16. The sensor according to claim 15, wherein the processor determines the temperature according to $$\frac{\frac{1}{\lambda_{as}^4}F(T)}{\sqrt{\left(\frac{1}{\lambda_p\lambda_{as}}\right)^4 \cdot \sigma\kappa}},$$

where $\lambda_{as}$ is a wavelength of the anti-Stokes Raman scatter, $\lambda_p$ is a wavelength of the primary Rayleigh scatter, σ represents all geometrical and fundamental constants associated with RAp, K represents all the geometrical and fundamental constants associated with RAas, and F(T) includes all temperature dependent terms.

\* \* \* \* \*